United States Patent [19]

Young

[11] Patent Number: 4,785,460
[45] Date of Patent: Nov. 15, 1988

[54] LASER GENERATED BY THE INTERACTION OF MOLECULES CONTAINING THE AZIDE RADICAL AND A MOLECULE CONTAINING A HALOGEN ATOM

[75] Inventor: Robert A. Young, Canoga Park, Calif.

[73] Assignee: Rockwell International Corporation, El Segundo, Calif.

[21] Appl. No.: 60,558

[22] Filed: Jun. 11, 1987

[51] Int. Cl.$^4$ ............................................. H01S 3/095
[52] U.S. Cl. ......................................... 372/89; 372/5
[58] Field of Search .................. 372/5, 77, 89, 39, 55; 372/90; 149/35

[56] References Cited

U.S. PATENT DOCUMENTS 4,165,773  8/1979  Coombe ................................. 372/89

OTHER PUBLICATIONS

Wiswall et al, "Operation of An ICl Fueled Oxygen-Iodine Chemical Laser", Appl. Phys. Lett. 45(1), Jul. 1, 1984, pp. 5-7.
Richardson et al, "Chemically Pumped Iodine Laser", Appl. Phys. Lett 35(2), Jul. 15, 1979, pp. 138-139.

Primary Examiner—William L. Sikes
Assistant Examiner—B. Randolph
Attorney, Agent, or Firm—H. Fredrick Hamann; Harry B. Field; David C. Faulkner

[57] ABSTRACT

Disclosed is a chemically pumped laser system including means for generating chemicals that react to produce electronically excited molecules used by the laser system.

14 Claims, 1 Drawing Sheet

LASER GENERATED BY THE INTERACTION OF MOLECULES CONTAINING THE AZIDE RADICAL AND A MOLECULE CONTAINING A HALOGEN ATOM

BACKGROUND OF THE INVENTION

1. Field of the Invention

This invention relates to chemically pumped lasers of both a continuous and pulsed type based on chemical reactions of the azide radical. The invention provides a means of generating chemicals that react to produce electronically excited molecules, means to combine the energy of these molecules and means to cause this energy to be emitted in a coherent beam of radiation.

2. Background Information

One chemically pumped electronic transition laser that has been demonstrated is the iodine laser. This laser consists of two parts: (a) a chemical generation of $O_2(a^1\Delta)$ by reaction of $Cl_2$ with $H_2O_2$; and (b) transfer of the energy of $O_2(a^1\Delta)$ to I.

$$O_2(a^1\Delta) + I(^2P_{3/2}) \rightarrow O_2(X^3\Sigma) + I(^2P_{\frac{1}{2}})$$

with subsequent lasing $$h\nu + I(^2P_{\frac{1}{2}}) \rightarrow 2h\nu + I(^2P_{3/2}).$$

These processes occur in a laser cavity. This laser emits in the infrared at $1.35\mu$.

Major practical problems exist in generating, transporting, and mixing $O_2(a^1\Delta)$ with iodine atoms. These are largely because $O_2(a^1\Delta)$ is generated by the reaction of a gas with a liquid at low temperature and pressure while iodine atoms must be formed and interact with $O_2(a^1\Delta)$ at higher temperatures in a gas stream from which contaminants from the $O_2(a^1\Delta)$ generator must be removed.

Aside from these practical difficulties, the long wavelength of this laser is unsuitable for some applications. In particular, if it is desired to focus the radiation from a chemical laser onto a target, the area of the optical elements scales as the wavelength, $\lambda$, squared, $\lambda^2$. Smaller optical elements resulting from a smaller $\lambda$ make a system less expensive and lighter in weight as well as smaller.

The general concept of a short wavelength chemical laser is simply to generate, by chemical reactions, electronically-excited product molecules capable of sustaining laser action. In practice, most chemical reactions give ground electronic state products. Those that do not generally give products in their first excited metastable state. This state, aside from having a small stimulated emission cross section, is usually quite low in energy ($\sim 1$ eV, 23 kcal/mole) and so unsuitable for visible lasing.

One way to generate more highly electronically excited molecules is to pool the energy of two less excited species. Indeed, this occurs in the "upconverter" laser $$H + NF_2 \rightarrow HF + NF(a^1\Delta)$$

$$h\nu + I(^2P_{3/2}) \rightarrow I^*(^2P_{\frac{1}{2}})$$

$$NF(a^1\Delta) + I^*(^2P_{\frac{1}{2}}) \rightarrow NF(b^1\Sigma) + I(^2P_{3/2})$$

Unfortunately, $NF(b^1\Sigma)$ is also metastable and unsuitable for lasing. It has been suggested that its energy be extracted by collisional energy transfer to a lasing molecule, such as IF $$NF(b^1\Sigma) + IF(X^3\Sigma) \rightarrow NF(X^3\Sigma) + IF(B^1\pi).$$

Unfortunately, this energy transfer is very slow while the reaction between $NF(b^1\Sigma)$ and $IF(X)$ is very fast.

Other methods of utilizing the energy stored in $NF(a^1\Delta)$ have been suggested. For example, reaction of $NF(a^1\Delta)$ with Bi atoms has been shown to produce emission from BiF* which is approximately twice as energetic as the emission from $NF(a^1\Delta)$. Such a laser has not been demonstrated.

SUMMARY OF THE INVENTION

An efficient source of electronically excited molecules is $$X + N_3 \rightarrow NX(a^1\Delta) + N_2$$

where X is a halogen atom such as F, Cl or I. These processes generally produce yields of electronically excited NX near 90%. If X represents the iodine atom, several fortuitous events occur to make a short wavelength laser feasible. In particular, $$I + N_3 \rightarrow NI(a^1\Delta) + N_2(X^3\Sigma)$$

$$NI(a^1\Delta) + I(^2P_{3/2}) \rightarrow NI(X^3\Sigma) + I^*(^2P_{\frac{1}{2}})$$

$$NI(a^1\Delta) + I^*(^2P_{\frac{1}{2}}) \rightarrow NI(b^1\Sigma) + I(^2P_{3/2})$$

$$h\nu + NI(b^1\Sigma) \rightarrow 2h\nu + NI(X^3\Sigma)$$

$$NI(X) + NI(X) \rightarrow N_2 + 2I(^2P_{3/2})$$

may lead to laser action without the need for auxiliary means to excite iodine, because of energy transfer from $NI(a^1\Delta)$, and without the need of an energy transfer species to extract the energy as radiation, because $NI(b^1\Sigma)$ has a short radiative lifetime. In addition, the first two steps generate $I^*(^2P_{\frac{1}{2}})$ and can constitute a chemical iodine laser because $h\nu + I^*(^2P_{\frac{1}{2}}) = 2h\nu + I(^2P_{3/2})$. All of the above reactions occur in a rapidly flowing and mixing gas stream such as is commonly used in existing iodine chemical laser systems.

For brevity, $NI(a^1\Delta)$ will be referenced by NI*, $NI(b^1\Sigma)$ by NI**, and $I(^2P_{\frac{1}{2}})$ by I*.

The primary fuel for such a laser would be I and $N_3$. These can be generated by $$HEAT + NaN_3 \rightarrow Na + N_3$$

$$I_2 + Na \rightarrow NaI + I$$

or by $$F + HN_3 \rightarrow HF + N_3$$

$$F + HI \rightarrow HF + I.$$

Unfortunately, the reaction $$H + NH_3 \rightarrow H_2 + N_3$$

is slow, although the reaction $$H + HI \rightarrow H_2 + I$$

is rapid so H seems an unsatisfactory fuel. However, since $F_2$+heated $NaN_3$ gives $NaF+FN_3$, $FN_3$ can replace $HN_3$ and H becomes a satisfactory fuel because $$H+FN_3 \rightarrow HF+N_3$$

is rapid.

It is an object of the invention to provide a chemically pumped laser using molecules containing the azide radical and a molecule containing an iodine atom to generate laser radiation characteristics of the NI molecule.

It is another objective of this invention to use the same reacting species to generate laser radiation characteristics of the I atom.

It is a further objective of this invention to generate the final reactants necessary to produce this laser radiation from liquids, solids, and gas containing, or composed, of said molecules.

DETAILED DESCRIPTION OF THE INVENTION

Figure 1:
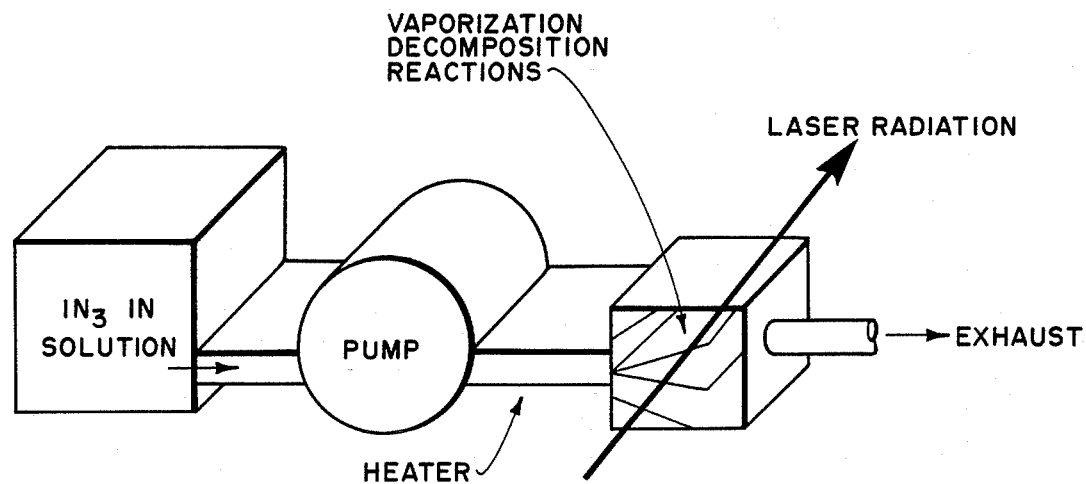
FIG. 1 is a schematic view of a chemically pumped laser system functional in accordance with the present invention.

FIG. 1 shows one embodiment of the invention. The azide molecule $IN_3$ combines the iodine atom and the azide radical in a single molecule. This unstable molecule is stabilized in a solution which is pumped into a vaporization cell where $IN_3$ also decomposes into $N_2$ and $IN(a^1\Delta)$ which then undergoes the following reactions $$HEAT+IN_3 \rightarrow IN(a^1\Delta)+N_2$$

$$IN(X)+IN(X) \rightarrow N_2+2I$$

$$I+NI(a^1\Delta) \rightarrow I^*+IN(X)$$

$$h\nu+I^* \rightarrow 2h\nu+I$$

or $$I^*+NI(a^1\Delta) \rightarrow I+NI(b^1\Sigma)$$

$$h\nu+NI(b^1\Sigma) \rightarrow 2h\nu+NI(X).$$

These reactions occur in the laser cavity.

Figure 2:
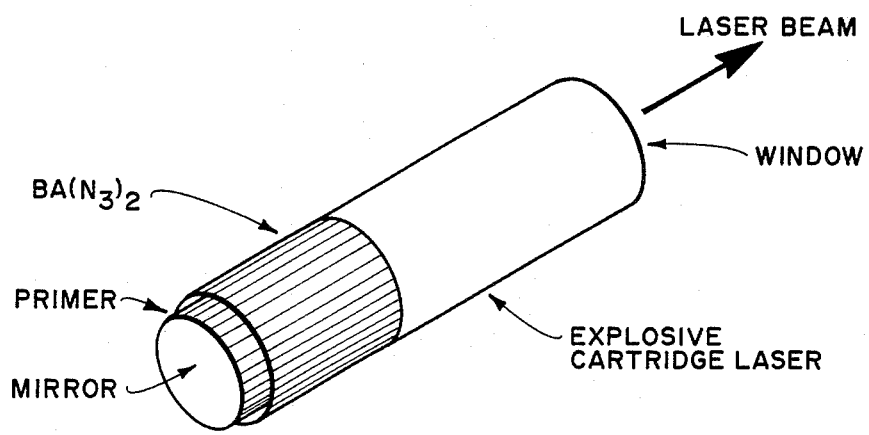
FIG. 2 is a view of an alternate embodiment in which a pulsed chemical laser utilizes a mixture of $Ba(N_3)_2$ and $I_2$ to effect lasing.

FIG. 2 shows another implementation of the invention in which a pulsed chemical laser utilizes a mixture of $Ba(N_3)_2$ and $I_2$. Upon initiation the $Ba(N_3)_2$ explosively decomposes to $$Ba(N_3)_2 \rightarrow Ba+2N_3$$

$$Ba+I_2 \rightarrow BaI+I$$

$$I+N_3 \rightarrow IN(a^1\Delta)+N_2$$

$$IN(a^1\Delta)+I \rightarrow IN(X)+I^*$$

$$h\nu+I^* \rightarrow 2h\nu+I$$

or $$I^*+IN(a^1\Delta) \rightarrow I+IN(b^1\Sigma)$$

$$h\nu+IN(b^1\Sigma) \rightarrow 2h\nu+IN(X).$$

The explosions occur in a laser cavity.

A similar set of reactions occur with $NaN_3$, but the decomposition of $NaN_3$ is not explosive $$HEAT+NaN_3 \rightarrow Na+N_3$$

$$Na+I_2 \rightarrow NaI+I$$

$$I+N_3 \rightarrow NI(a^1\Delta)+N_2$$

$$I+NI(a^1\Delta) \rightarrow I^*+N(X)$$

$$h\nu+I^* \rightarrow 2h\nu+I$$

or $$I^*+NI(a^1\Delta) \rightarrow I+NI(b^1\Sigma)$$

$$h\nu+NI(b^1\Sigma) \rightarrow 2h\nu+NI(X)$$

This could be embodied in the device shown in FIG. 1 if both $I_2$ and $NaN_3$ are dissolved in a fluid.

Obviously, many modifications and variations of the present invention are possible in light of the above teachings It is therefore to be understood that, within the scope of the appended claims, the invention may be practiced otherwise than as specifically described.

What is claimed and desired to be secured by Letters Patent of the United States is:

1. A method for generating a lasing effect in a chemically pumped laser using molecules containing the azide radical and a molecule containing an iodine atom, the method comprising:
    (a) providing a replenishable chemical source of $N_3$ and I;
    (b) introducing by mixing gas streams, the $N_3$ and I into a laser cavity;
    (c) reacting the $N_3$ and I in the laser cavity;
    (d) producing excited species within the laser cavity from the reaction of $N_3$ and I;
    (e) generating a lasing effect by the interaction of reactants contained within the laser cavity, said reactants selected from excited species and I; and
    (f) cooling the laser system to remove thermal energy.

2. The method of claim 1 in which the chemical source of $N_3$ is thermally decomposing $IN_3$.

3. The method of claim 1 in which the chemical source of $N_3$ is a thermally decomposing alkali metal azide.

4. The method of claim 1 in which the chemical source of $N_3$ is decomposing $Ba(N_3)_2$.

5. The method of claim 1 in which the chemical source of $N_3$ is the reaction of H with $FN_3$ in a gas phase wherein the $FN_3$ is produced by reacting $FN_3$ with an alkali metal azide.

6. The method of claim 1 in which the chemical source of I is thermally dissociated $I_2$.

7. The method of claim 1 in which the chemical source of I is the reaction of $I_2$ with an alkali metal atom.

8. The method of claim 1 in which the chemical source of I is the reaction of $I_2$ with Ba.

9. The method of claim 1 in which the reaction of $N_3$ and I occurs by mixing streams of gas separately containing $N_3$ and I.

10. The method of claim 1 in which the reaction $$I + N_3 \rightarrow NI(a^1\Delta) + N_3$$

generates an electronically excited specie.

11. The method of claim 1 in which $$I(^2P_{3/2}) + NI(a^1\Delta) \rightarrow I^*(^2P_{\frac{1}{2}}) + NI(X)$$

generates an electronically excited specie.

12. The method of claim 1 in which lasing is generated according to the reaction $$h\nu + I^*(^2P_{\frac{1}{2}}) \rightarrow 2h\nu + I(^2P_{3/2}).$$

13. The method of claim 1 in which the reaction $$I^*(^2P_{\frac{1}{2}}) + NI(a^1\Delta) \rightarrow I(^2P_{3/2}) + NI(b^1\Sigma)$$

generates an electronically excited specie.

14. The method of claim 1 in which lasing is generated according to the reaction $$h\nu + NI(b^1\Sigma) \rightarrow 2h\nu + NI(X).$$

* * * * *